US010467046B2

(12) United States Patent
Vyas et al.

(10) Patent No.: US 10,467,046 B2
(45) Date of Patent: Nov. 5, 2019

(54) FAST AND GREEDY SCHEDULING MACHINE BASED ON A DISTANCE MATRIX

(71) Applicant: Red Hat, Inc., Raleigh, NC (US)

(72) Inventors: Jay Vyas, Concord, MA (US); Huamin Chen, Westborough, MA (US)

(73) Assignee: RED HAT, INC., Raleigh, NC (US)

( * ) Notice: Subject to any disclaimer, the term of this patent is extended or adjusted under 35 U.S.C. 154(b) by 297 days.

(21) Appl. No.: 15/608,234

(22) Filed: May 30, 2017

(65) Prior Publication Data
US 2018/0349174 A1    Dec. 6, 2018

(51) Int. Cl.
G06F 9/48    (2006.01)
G06F 9/455   (2018.01)
G06F 9/50    (2006.01)

(52) U.S. Cl.
CPC ........ *G06F 9/4843* (2013.01); *G06F 9/45558* (2013.01); *G06F 9/50* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,035,928 | B2 * | 4/2006 | McMahan | G06F 9/5011 709/212 |
| 7,302,450 | B2 * | 11/2007 | Benedetti | G06F 9/5083 |
| 9,256,467 | B1 * | 2/2016 | Singh | G06F 9/5055 |
| 9,473,365 | B2 | 10/2016 | Melander et al. | |
| 9,563,480 | B2 | 2/2017 | Messerli et al. | |
| 9,613,100 | B2 | 4/2017 | Lanier | |

(Continued)

FOREIGN PATENT DOCUMENTS

WO    2017027602 A    2/2017

OTHER PUBLICATIONS

Energy-Efficient Management of Resources in Container-Based Clouds; Mar. 2016; by Sareh Fotuhi Piraghaj; Department of Computing and Information Systems; The University of Melbourne, Australia.
Moving Hadoop into the Cloud with Flexible Slot Management and Speculative Execution; Jul. 7, 2016; by Yanfei Guo Jia Roa, Changjun Jiange, Xiabo Zhou; Department Computer Science; University of Colorado; Colorado Springs, CO; Key Lab of Embedded System and Service Computing, Ministry of Education; Tongji University, Shanghai, China.
(Continued)

*Primary Examiner* — Chat C Do
*Assistant Examiner* — Douglas M Slachta
(74) *Attorney, Agent, or Firm* — K&L Gates LLP (57) ABSTRACT

A method for scheduling containers includes receiving attribute values for every node, generating location metrics for each node based on each node's attribute values, generating distance values, including a first distance value corresponding to the distance between a first node and second node. Each distance value represents the distance between respective location metrics for respective nodes. A distance matrix is populated with the distance values. The scheduler initiates an attempt to schedule a container at the first node, compares attribute requirements of the container to the first attribute values, and determines that at least one of the attribute requirements of the container exceeds a respective attribute value of the first attribute values. The second node is selected from the distance matrix based on the first distance value, and the scheduler initiates an attempt to schedule the container at the second node selected from the distance matrix.

18 Claims, 9 Drawing Sheets

(56) References Cited

U.S. PATENT DOCUMENTS

| | | | | |
|---|---|---|---|---|
| 9,886,307 | B2* | 2/2018 | Hildrum | H04L 67/104 |
| 10,031,774 | B2* | 7/2018 | Chen | G06F 9/4881 |
| 2013/0275975 | A1* | 10/2013 | Masuda | G06F 9/5077 |
| | | | | 718/1 |
| 2015/0089496 | A1* | 3/2015 | Thankappan | G06F 9/5005 |
| | | | | 718/1 |
| 2016/0154660 | A1* | 6/2016 | Clark | G06F 9/45558 |
| | | | | 718/1 |
| 2016/0162209 | A1 | 6/2016 | Calderone et al. | |
| 2016/0378559 | A1 | 12/2016 | Bhandarkar et al. | |
| 2017/0017521 | A1* | 1/2017 | Gupta | G06F 9/5011 |
| 2018/0046503 | A1* | 2/2018 | Feng | G06F 9/5033 |
| 2018/0081722 | A1* | 3/2018 | Kirchner | G06F 9/505 |
| 2018/0219877 | A1* | 8/2018 | Hsu | G06F 21/62 |

OTHER PUBLICATIONS

An Improved Distance Matrix Computation Algorithm for Multicore Clusters; Jun. 12, 2014; by Mohammed W. Al-Veama, Naglaa M. Reda, Fayed F. M. Ghaleb; Department of Mathematics, Faculty of Science, Al-Azhar University, Cairo, Egypt; Education College for Girls, Mosul University, Mosul, Iraq; Department of Mathematics, Faculty of Science, Ain Shams University, Cairo, Egypt.

Distance Matrix Based Heuristics to Minimize Makespan of Parallel Batch Processing Machines with Arbitrary Job Sizes and Release Times; Mar. 2017; by Shengchao Zhou, Huaping Chen, Xueping Li; School of Logistics, Central South University of Forestry and Technology, Changsha, Hunan 410004, China; School of Management, University of Science and Technology of China, Hefei, Anhui 230026, China; Department of Industrial and Systems Engineering, University of Tennessee, Knoxville, TN 37996, USA.

* cited by examiner

FAST AND GREEDY SCHEDULING MACHINE BASED ON A DISTANCE MATRIX

BACKGROUND

Virtualization, such as the use of a virtual machine, may be used to provide some physical components as logical objects in order to allow running various software modules. Virtualization allows, for example, consolidating multiple physical servers into one physical server running multiple virtual machines in order to improve the hardware utilization rate. Virtualization may typically involve a virtual machine executing for intermittent periods of time on one or more physical processors.

A container may be a virtualized object similar to a virtual machine except that, typically, a container may not implement a guest operating system and may, for example, instead utilize a host operating system of a physical machine. One or more applications and/or utilities may execute in a container. A container may have one or more respective, filesystems, memory, devices, network ports, etc. for accessing the physical resources of the physical machine and other resources outside of the physical machine. Specific requests to access physical resources inside or outside of the physical machine may be made through the host operating system.

Typically, containers may be launched to provide extra compute capacity of a type that the container is designed to provide. Containers allow a programmer to quickly scale the deployment of applications to the volume of traffic requesting the applications. Containers may be deployed in a variety of hardware environments. To attempt to maximize the usage of computer hardware through parallel processing using virtualization, it may be advantageous to maximize the density of containers in a given hardware environment, for example, in a multi-tenant cloud.

Containers may be clustered together to perform a more complex function than containers are capable of performing individually. A scheduler may be implemented, for example, to allocate containers and clusters of containers to various nodes. Depending on the functionality of a container or cluster of containers, there may be advantages for different types of deployment schemes.

SUMMARY

The present disclosure provides new and innovative methods and systems for container scheduling. An example method includes receiving attribute values for every node indicating availability to execute containers, including a first node having first attribute values, and a second node having second attribute values. Location metrics are generated, including a location metric for each node, based on each node's attribute values, the location metrics including a first location metric for the first node based on the first attribute values, and a second location metric for the second node based on the second attribute values.

The method further includes generating distance values, where each distance value represents the distance between respective location metrics for respective nodes, the distance values including a first distance value corresponding to the distance between a first location metric and the second location metric. A distance matrix is populated with the distance values, including the first distance value. The scheduler initiates an attempt to schedule a container at the first node, compares attribute requirements of the container to the first attribute values, and determines that at least one of the attribute requirements of the container exceeds a respective attribute value of the first attribute values. The second node is selected from the distance matrix based on the first distance value, and the scheduler initiates an attempt to schedule the container at the second node selected from the distance matrix.

An example system includes a processor, an orchestrator executing on the processor, and a scheduler executing on the processor to receive attribute values for every node indicating availability to execute containers, including a first node having first attribute values, and a second node having second attribute values. Location metrics are generated, including a location metric for each node, based on each node's attribute values, the location metrics including a first location metric for the first node based on the first attribute values, and a second location metric for the second node based on the second attribute values. Distance values are generated, where each distance value represents the distance between respective location metrics for respective nodes, the distance values including a first distance value corresponding to the distance between a first location metric and the second location metric. A distance matrix is populated with the distance values, including the first distance value. The scheduler initiates an attempt to schedule a container at the first node, compares attribute requirements of the container to the first attribute values, and determines that at least one of the attribute requirements of the container exceeds a respective attribute value of the first attribute values. A second node is selected from the distance matrix based on the first distance value. The scheduler initiates an attempt to schedule the container at the second node selected from the distance matrix.

Additional features and advantages of the disclosed methods and system are described in, and will be apparent from, the following Detailed Description and the Figures.

DETAILED DESCRIPTION OF EXAMPLE EMBODIMENTS

In computer systems utilizing isolated guests, typically, virtual machines and/or containers are used. In an example, a virtual machine ("VM") may be a robust simulation of an actual physical computer system utilizing a hypervisor to allocate physical resources to the virtual machine. In some examples, a container based virtualization system such as Red Hat® OpenShift® or Docker® may be advantageous as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In large scale implementations, container schedulers, such as those included in container orchestrators (e.g., Kubernetes®), generally respond to frequent container startups and cleanups with low latency. Containers may allow wide spread, parallel deployment of computing power for specific tasks in a typical example, a container may be instantiated to process a specific task and reaped after the task is complete.

Due to economies of scale, containers tend to be more advantageous in large scale hardware deployments where the relatively fast ramp-up time of containers allows for more flexibility for many different types of applications to share computing time on the same physical hardware, for example, in a private or multi-tenant cloud environment. In some examples, where containers from a homogenous source are deployed, it may be advantageous to deploy containers directly on physical hosts. In a multi-tenant cloud, it may be advantageous to deploy containers and groups of containers within virtual machines as the hosting service may not typically be able to predict dependencies for the containers such as shared operating systems, and therefore, using virtual machines adds flexibility for deploying containers from a variety of sources on the same physical host. Typically, while containers may be relatively light weight and disposable, at least some of the data that is processed by the container or data that results from the processing of the container may be persistent data. In an example, for processing more complex tasks, multiple containers may be grouped together into container clusters (e.g., Kubernetes® pods), that are deployed together and function as an interconnected whole. For example, a cluster of containers may be deployed, each responsible for handling one or more processing steps between an original input and a final output after the entire cluster is finished acting on the input whether in series or in parallel.

In some large scale deployments, thousands of containers may simultaneously require scheduling. A host node may host hundreds of containers, each of which may independently execute tasks. In an example, a scheduler may be used to allocate tasks to the various host nodes in communication with the scheduler to execute containers on the various host nodes. However, in an example, if a scheduler reads the metadata of thousands of containers and compares the containers to the thousands of host nodes available to host each container before attempting to schedule the container, the scheduler may create a funneling system through the scheduler, causing great delays in scheduling.

For example, an online shopping website may have periods of time where activity is much higher than usual (e.g., during the holidays). This time period will likely cause large bursts of activity, and will require hundreds or thousands of containers to need scheduling, such as customers waiting to checkout their purchases. In this example, if the scheduler is required to read the metadata of each container and compare that metadata to the attributes of each available node, it will cause delays in scheduling, and customers attempting to check out to wait for longer time periods. This may cause the online retailer to lose checkout completions due to impatient customers.

Aspects of the present disclosure address the above noted deficiency by employing a scheduling machine based on a distance matrix. A greedy scheduler is configured to find a locally optimal choice at each stage with the hope of finding a global optimum. A distance matrix may be provided as a square matrix (e.g., two-dimensional array) containing the distances between the elements of the set. For example, if there are N elements, the matrix will have an N×N size. In an example, a scheduler (or orchestrator) may generate, based on the attributes of each node, location metrics for each node. These location metrics may be used to develop distances values between each node which may be populated in the distance matrix. For example, by relying on the distance matrix in order to schedule containers at nodes, the scheduler may avoid reading the attributes of each node and/or the metadata of each container individually. Rather, the scheduler may take a greedy approach to scheduling containers based on node distances noted in the distance matrix (e.g., the largest value in a row of the matrix). By finding the largest distance value in a row of the distance matrix, the scheduler need not find a global solution where a node meets all of the container's attribute requirements, but rather schedules by finding a local solution (e.g., largest value in the matrix). Using the distance matrix to schedule greedily helps containers get scheduled faster, as the scheduling is broken down into simpler pieces.

Figure 1:
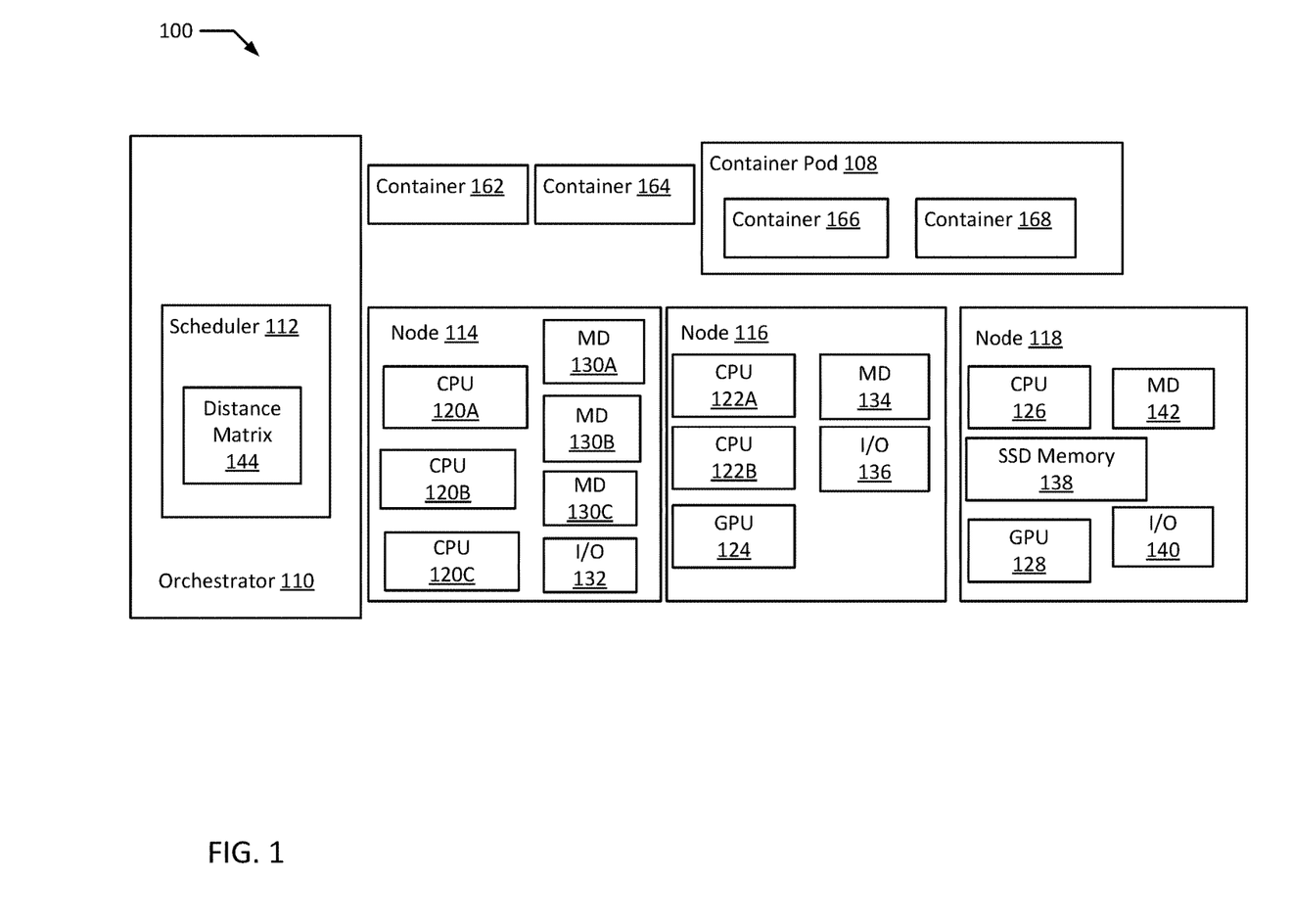
FIG. 1 is a block diagram of an example system according to an example of the present disclosure.

FIG. 1 depicts a high-level component diagram of an example system 100 for different availability and performance requirements. For example, the system 100 may include nodes 114, 116, and 118. Node 114 may include CPUs 120A, 120B, and 120C. Node 114 may also include memory devices 130A, 130B, 130C, and input/output ("I/O") device 132. Node 116 may include CPUs 122A, 122B, GPU 124, memory device 134, and I/O device 136. Node 118 may include CPU 126, GPU 128, solid state drive memory ("SSD") 138, memory device 142, and I/O device 140.

The system 100 may include an orchestrator 110. The orchestrator 110 may include a scheduler 112. The scheduler 112 may include a distance matrix 144. Further, the system 100 may include containers 162 and 164, and container pod 108. The container pod 108 may contain one or more containers 166 and 168.

In an example, the scheduler 112 may receive attribute information from node 114, 116, 118 (e.g., information regarding CPU, MD, I/O, GPU, SSD). Using the attribute information, scheduler 112 may generate location metrics for each node. Once all nodes have a location metric the scheduler 112 may generate a distance value, which is the distance between each location metrics of each respective node 114, 116, 118. The distance matrix 144 may be populated with the generated distance values.

As discussed herein, a memory device refers to a volatile or non-volatile memory device, such as RAM, ROM, EEPROM, or any other device capable of storing data. As used herein, physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). Processors may be interconnected using a variety of techniques, ranging from a point-to-point processor interconnect, to a system area network, such as an Ethernet-based network. In an example, the one or more physical processors may be in the system 100. In an example, all of the disclosed methods and procedures described herein can be implemented by the one or more processors. Further, the system 100 may be distributed over multiple processors, memories, and networks.

Further, system 100 may also include an input/output devices (e.g., a network device, a network interface controller (NIC), a network adapter, any other component that connects a computer to a computer network, a peripheral component interconnect (PCI) device, storage devices, sound or video adaptors, photo/video cameras, printer devices, keyboards, displays, etc.), for example the I/O 132, 136, and 140, may be coupled to a processor.

Figure 2A:
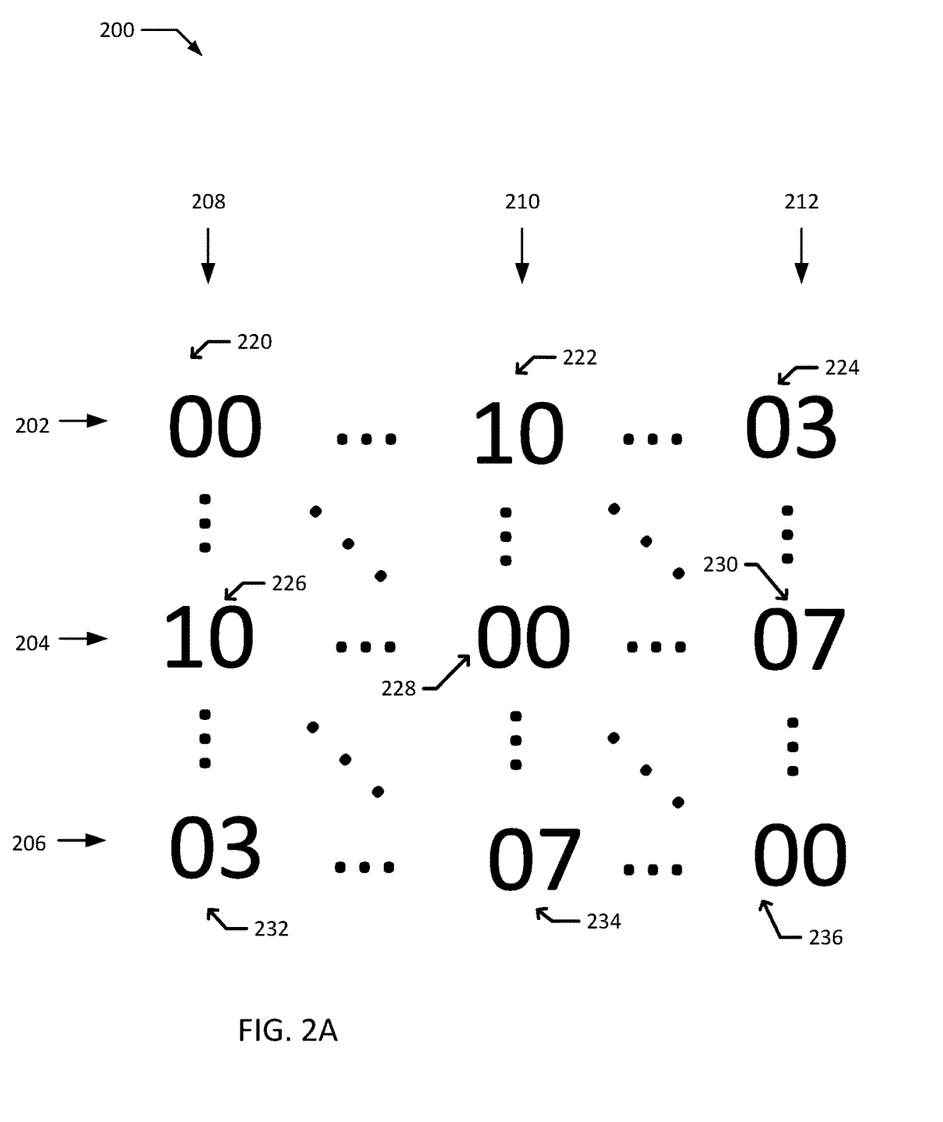
FIG. 2A is a matrix diagram of an example system according to an example of the present disclosure.

FIG. 2 illustrates a matrix diagram of an example system according to an example of the present disclosure. The example matrix 200 represents an N×N matrix, as depicted by the horizontal, vertical, and diagonal ellipses. The example matrix includes a column 208 associated with a node 1, column 210 associated with a node 2, and column 212 associated with a node 3. The example matrix includes a row 202 associated with node 1, a row 204 associated with node 2, and a row 206 associated with node 3.

The distance values 220, 222, 224, 226, 228, 230, 232, 234, and 236 are all based on the location metrics of each node. In this example, node 1 was assigned example attributes such as having a GPU and having 16 gigabytes of memory. Node 2 was assigned example attributes such as having no GPU and 16 gigabytes of memory. Node 3 was assigned example attributes such as having a 4 CPUs and 8 gigabytes of memory. A scheduler would quantify these attributes by assigning a schedulable characteristic to each attribute. In this example, the scheduler would assign not having a GPU ten points to the distance, making it be farther away, and would assign any memory below a threshold of 16 gigabytes to add the $\log_2$(memory) to the distance. This would, in effect, cause less capable machines to have a farther distance. Therefore, node 1 would have total of 0. Node 2 would have a total of 10. And, node 3 would have a total of 3. Therefore, distance values, such as 220, 222, 224, 226, 228, 230, 232, 234, and 236 may be generated taking the distance of node 1 (0) from node 2 (10) from node 3 (3). The distance between node 1 and node 2 is 10, as indicated by numerals 222 and 226. The distance between node 1 and node 3 is 3, as indicated by numerals 224 and 232. The distance between node 2 and node 3 is 7, as indicated by numerals 230 and 234.

As depicted, the distances for each node and that same node is 0. For example, the distance value from node 1 to node 1 is 0, as indicated by distance value 220. The distance value from node 2 to node 2 is 0, as indicated by distance value 228. The distance value from node 3 to node 3 is 0, as indicated by distance value 236.

A scheduler may find it unnecessary to generate the entire matrix, as taken diagonally along the zero values, the top half and bottom half of the matrix are mirror images. Therefore, a scheduler may also only require populating approximately half the matrix instead of the whole matrix.

Figure 2B:
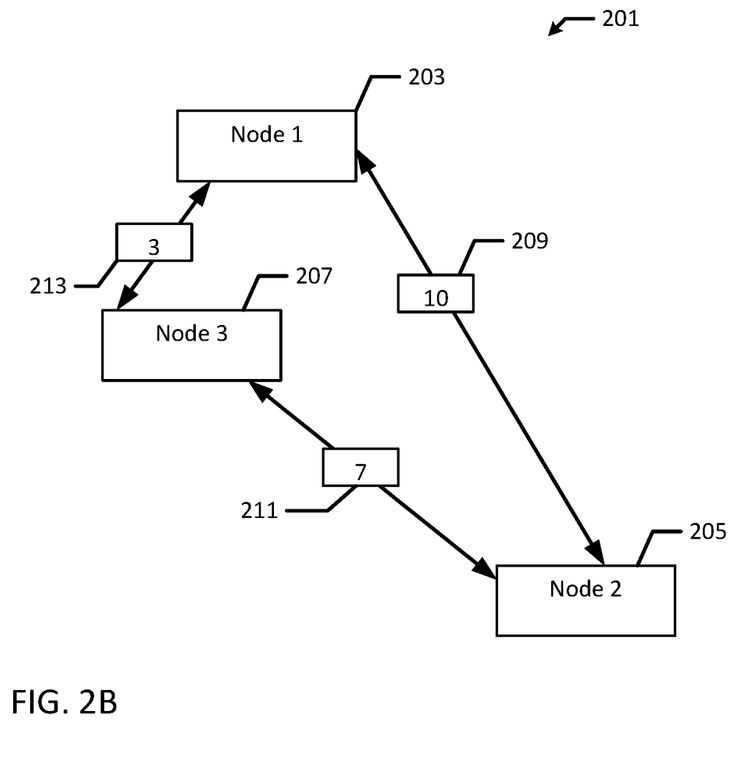
FIG. 2B is a block diagram of an example system according to an example of the present disclosure.

FIG. 2B is a block diagram of an example system according to an example of the present disclosure depicting the distance values of the matrix from FIG. 2A. In diagram 201, node 1 (203) is depicted at a distance of 10 (209) away from node 2 (205). The longest arrow is between node 1 (203) and node 2 (205) because their distance 209 is the farthest, which represents that node 1 (203) and node 2 (205) likely have maximally different attributes of nodes 203, 205, 207. Node 3 (207) is at a distance of 7 (211) from node 2 (205), and therefore the arrow between node 3 (207) and node 2 (205) is shorter than the arrow between node 1 (203) and node 2 (205). Similarly, node 1 (203) is at a distance of 3 (213) away from node 3 (207). Therefore, the arrow between node 1 (203) and node 3 (207) is shorter than the arrow between node 3 (207) and node 2 (205), which represents that node 3 (207) and node 2 (205) likely have minimally different attributes of these nodes 203, 205, 213. The location metric of a node is representative of an N-dimensional location is an N-dimensional attribute space. The distance metric may be a scalar value in the N-dimensional space.

Figure 3:
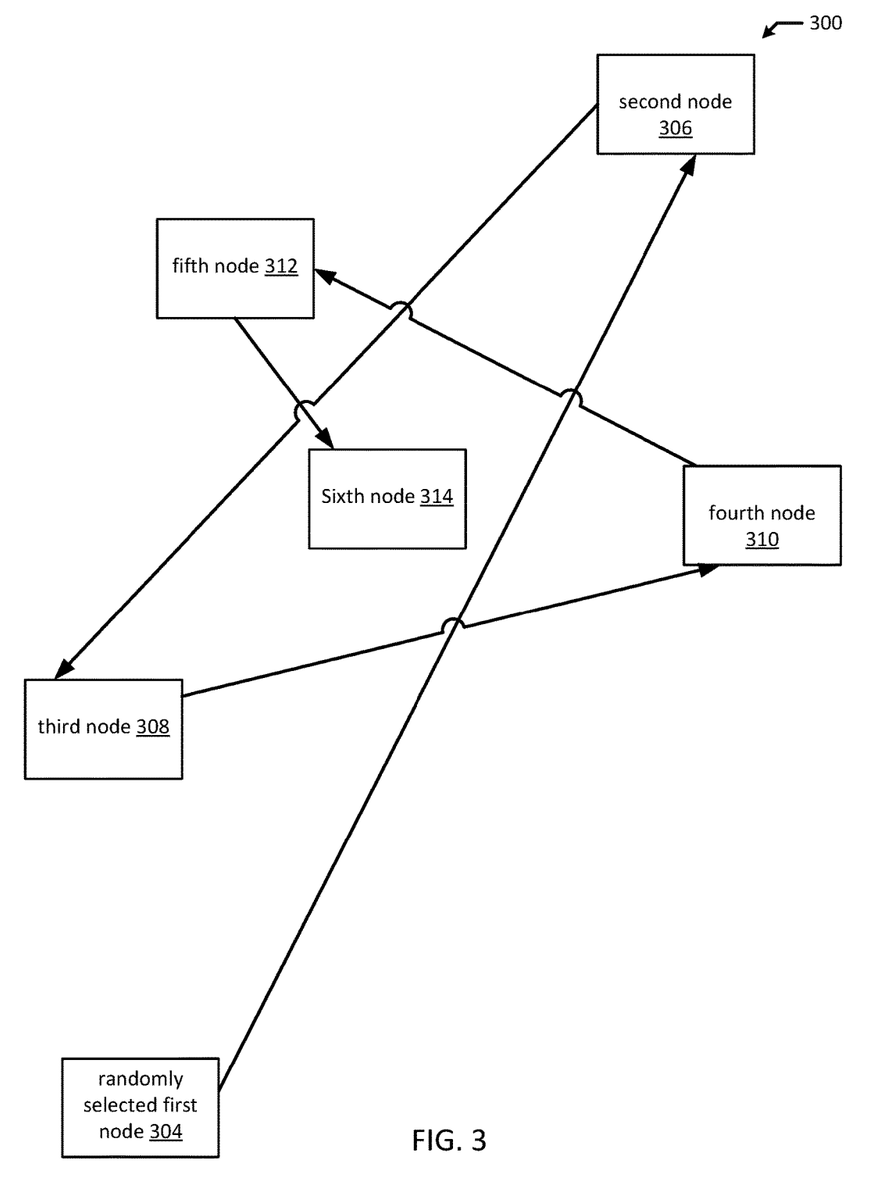
FIG. 3 is a block diagram of an example system according to an example of the present disclosure.

FIG. 3 is a block diagram of an example system according to an example of the present disclosure. System 300 depicts an example of how the scheduler may schedule a container using the generated, or included, distance matrix. The scheduler first selects a random first node 304 from among all the nodes that indicate they have capacity to execute the container. In an alternative example, the first node is not selected randomly.

The scheduler then determines whether all the attribute requirements of the container are met by the randomly selected first node 304's attributes. If all of the attribute requirements of the container are met, the container is scheduled at the randomly selected first node 304. If any of the attribute requirements of the container exceed the attributes of the randomly selected first node 304, the scheduler selects a value from the distance matrix that is the largest value in the row of the randomly selected first node 304. The largest value may be representative of a node having maximally different schedulable characteristic and/or attributes from the randomly selected node 304. The node associated with the largest value is selected as the second node 306. The scheduler next attempts to schedule the container at the second node 306. Accordingly, the scheduler is configured to test a very broad population of nodes with widely differing attributes.

Similarly, the scheduler then determines whether all the attribute requirements of the container are met by the second node 306's attributes. If all of the attribute requirements of the container are met, the container is scheduled at the second node 306. If any of the attribute requirements of the container exceed the attributes of the second node 306, the scheduler selects a value from the distance matrix that is the largest value in the row of the second node 306. The largest value selected from the row of the second node 306 is associated with a third node 308. The process continues until the container is finally scheduled. In this example illustrated in FIG. 3, the scheduler goes through three more iterations, at a fourth node 310, a fifth node 312, and a sixth node 314, before finally being scheduled at the sixth node 314.

Figure 4:
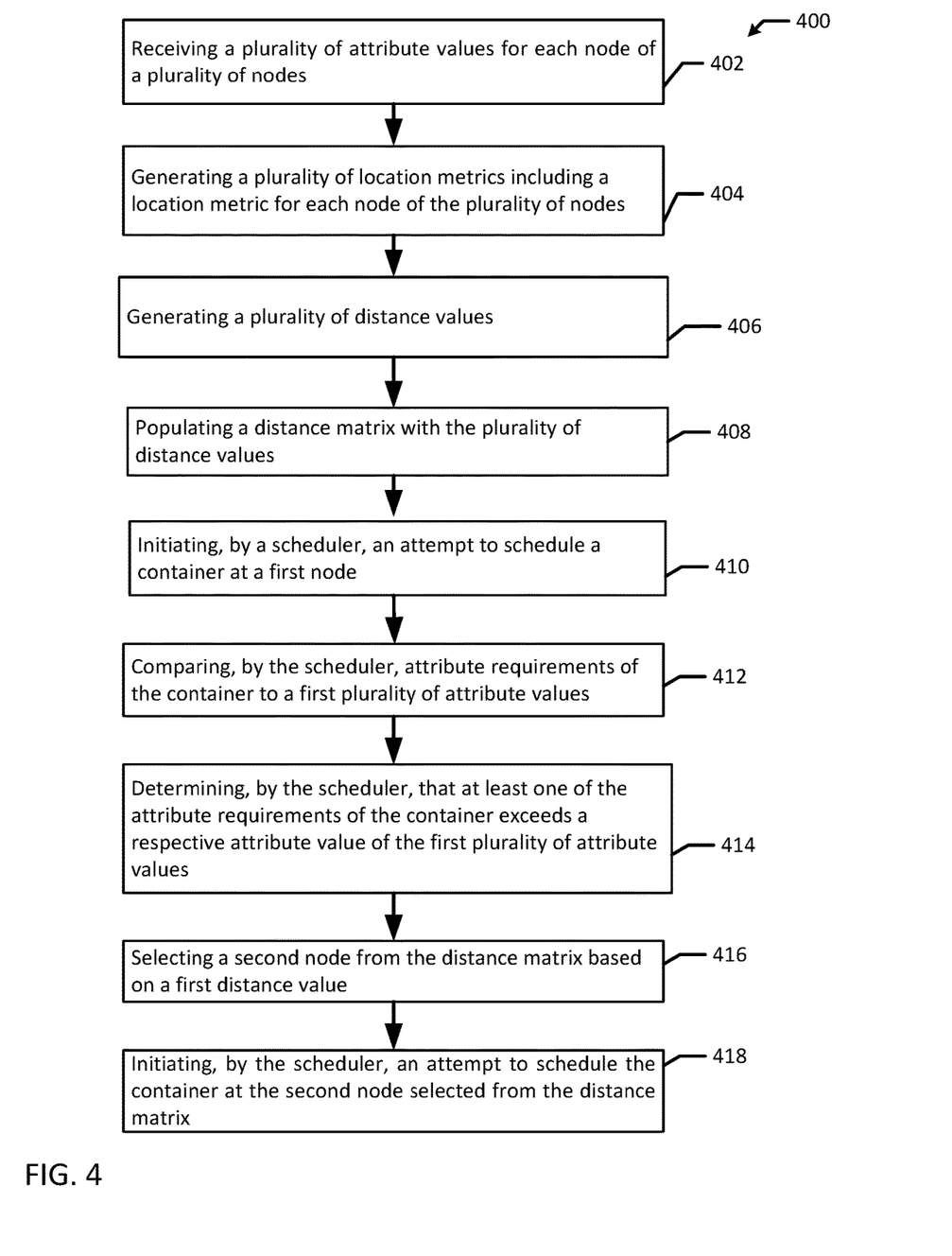
FIG. 4 is a flowchart illustrating an example method of operating a system for a scheduling machine based on a distance matrix according to an example of the present disclosure.

FIG. 4 is a flowchart illustrating operating a system 100 for a scheduling machine based on a distance matrix Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional.

The method 400 begins by receiving a plurality of attribute values for each node of a plurality of nodes (block 402). For example, the scheduler receives attribute values for each node, where the nodes are indicated as available to execute containers, including a first node having first attribute values, and a second node having second attribute values. For example, node 114, 116 and 118 send their attribute values to scheduler 112 or orchestrator 110. For example, node 114 may send 3 CPU cores, 12 GB, no GPU, no SSD, and zone 1.

Next, a plurality of location metrics are generated, including a location metric for each node of the plurality of nodes (block 404). For example, location metrics are generated, including a location metric for each node, based on each node's attribute values, the location metrics including a first location metric for the first node based on the first attribute values, and a second location metric for the second node based on the second attribute values. For example, each attribute value of each node 114, 116 and 118 (CPUs, MDs, I/O, GPUs, SSD, etc.) will be parameterized as schedulable characteristics. Then the summation of each parameterized schedulable characteristic will be taken per node. Therefore, for example, node 114 will have one location metric that represents the sum of the schedulable characteristics of the resources available in node 114, CPUs 120A, 120B, 120C, MDs 130A, 130B, 130C, and I/O 132.

Next, a plurality of distance values are generated (block 406). For example, distance values are generated where each distance value represents a respective distance between respective location metrics for respective nodes, the distance values including a first distance value corresponding to the first location metric and the second location metric. For example, a distance value will be generated between node 114 and node 116, between node 114 and node 118, and between node 116 and node 118.

Next, a distance matrix is populated with a plurality of distance values (block 408). For example, the distance matrix is populated with the distance values, including the first distance value. For example, the distance values between node 114 and 116, between node 114 and node 118, and between node 116 and node 118 will be stored into the distance matrix 144.

Next, the scheduler initiates an attempt to schedule a container at a first node (block 410), and compares the attribute requirements of the container to a first plurality of attribute values (block 412). For example, the scheduler initiates an attempt to schedule a container at the first node, and compares the attribute requirements of the container to the first attribute values. For example, the first node could be any of node 114, 116, or 118 depending on how the first node is selected. For this example, node 116 is randomly selected by the scheduler 112, which then attempts to schedule the container at the node 116. The scheduler 112 will check the container's attribute requirements (e.g., metadata with minimum requirements of 16 GB, a GPU, 3 CPU cores, and 1 SSD), and check node 116's attribute values (e.g., 8 GB, 4 CPU cores, 1 GPU, and 0 SSD) to determine if the container fits node 116. For example, if the container requires at least 16 gigabytes of memory and node 116 has 8 gigabytes of available memory, the container does not fit node 116.

Next, the scheduler determines that at least one of the attribute requirements of the container exceeds a respective attribute value of the first plurality of attribute values (block 414), and selects a second node from the distance matrix based on a first distance value (block 416). For example, the scheduler determines that at least one of the attribute requirements of the container exceed a respective attribute value of the first attribute values, and therefore selects a second node from the distance matrix based on the first distance value. For example, the scheduler 112 may determine that the container requires an SSD memory and 16 GB of memory, and node 116 does not have an SSD memory and only has 8 GB of memory. Therefore, the scheduler 112 may look at the row corresponding to node 116 in the distance matrix 144, and select the highest distance value in that row. The second node will be either node 114 or node 118, whichever corresponds to the highest distance value in the distance matrix 144. For this example, the second node is node 118.

Next, the scheduler initiates an attempt to schedule the container at the second node selected from the distance matrix (block 418). For example, the scheduler 112 attempts to schedule the container at node 118, as discussed above. In an example, the method 400 is iterated until the container is successfully scheduled on a node (e.g., on node 114).

Figure 5A:
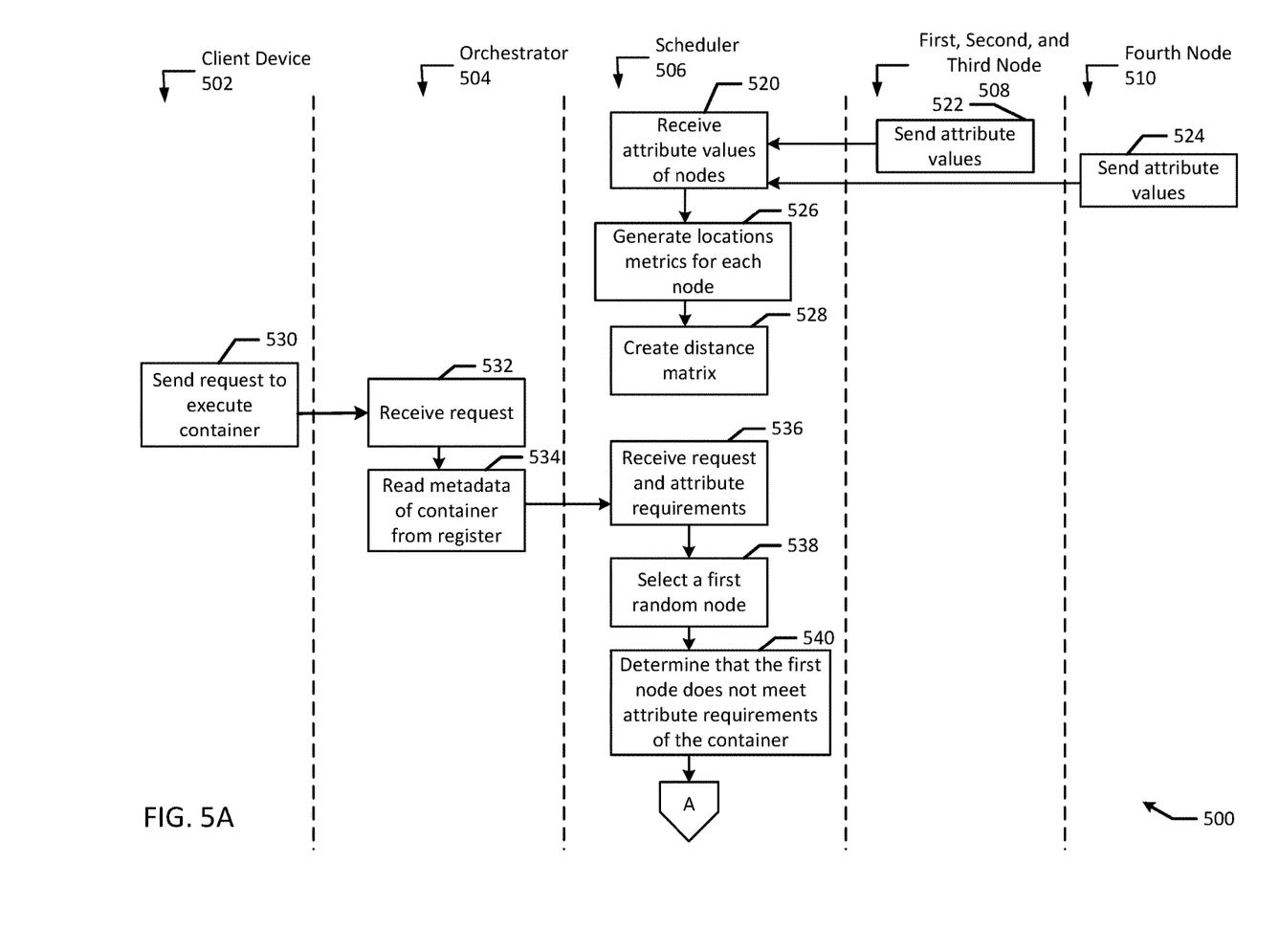
FIG. 5A is a flow diagram illustrating example methods of operating a system for a scheduling machine based on a distance matrix according to an example of the present disclosure.
Figure 5B:
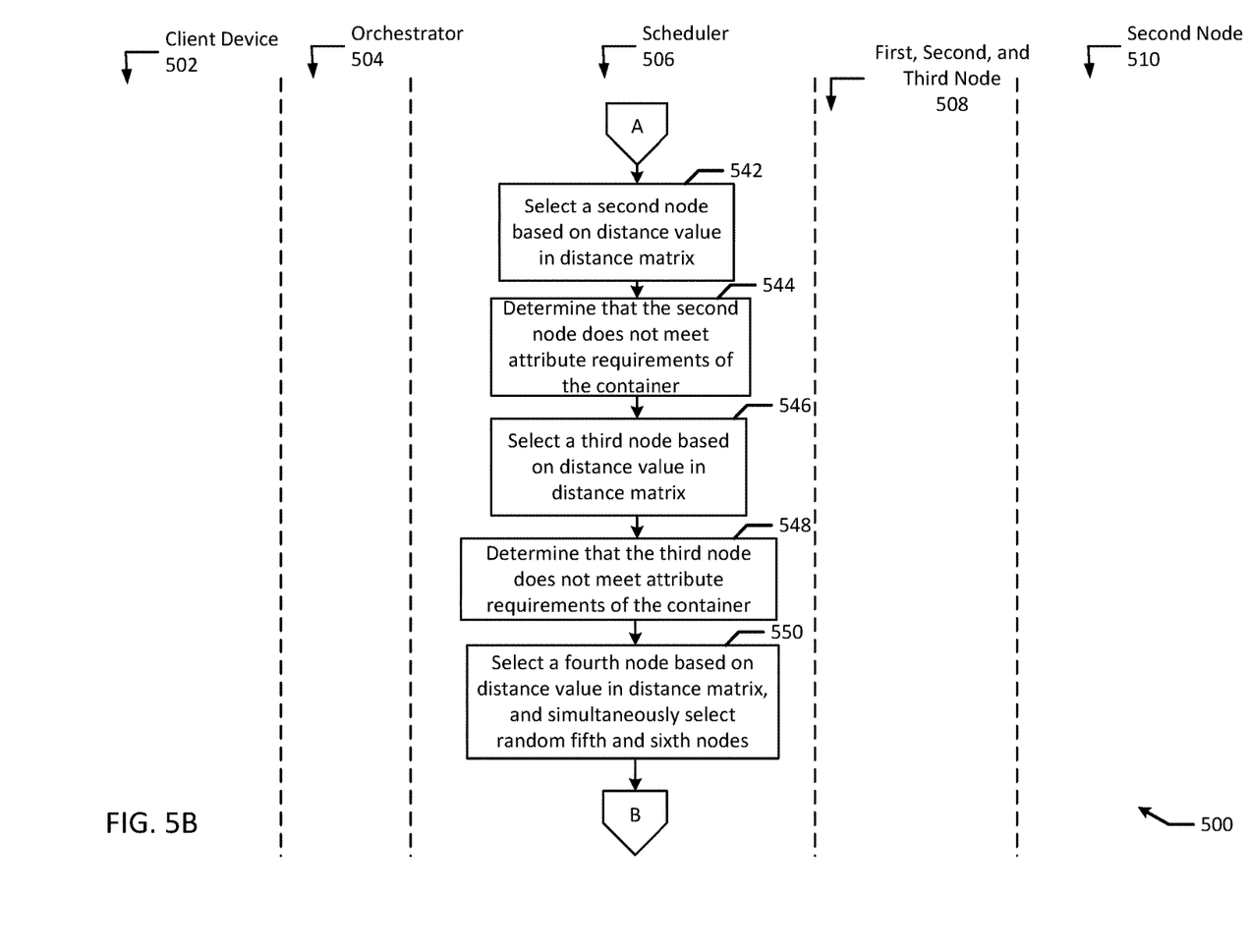
FIG. 5B is a flow diagram illustrating example methods of operating a system for a scheduling machine based on a distance matrix according to an example of the present disclosure.
Figure 5C:
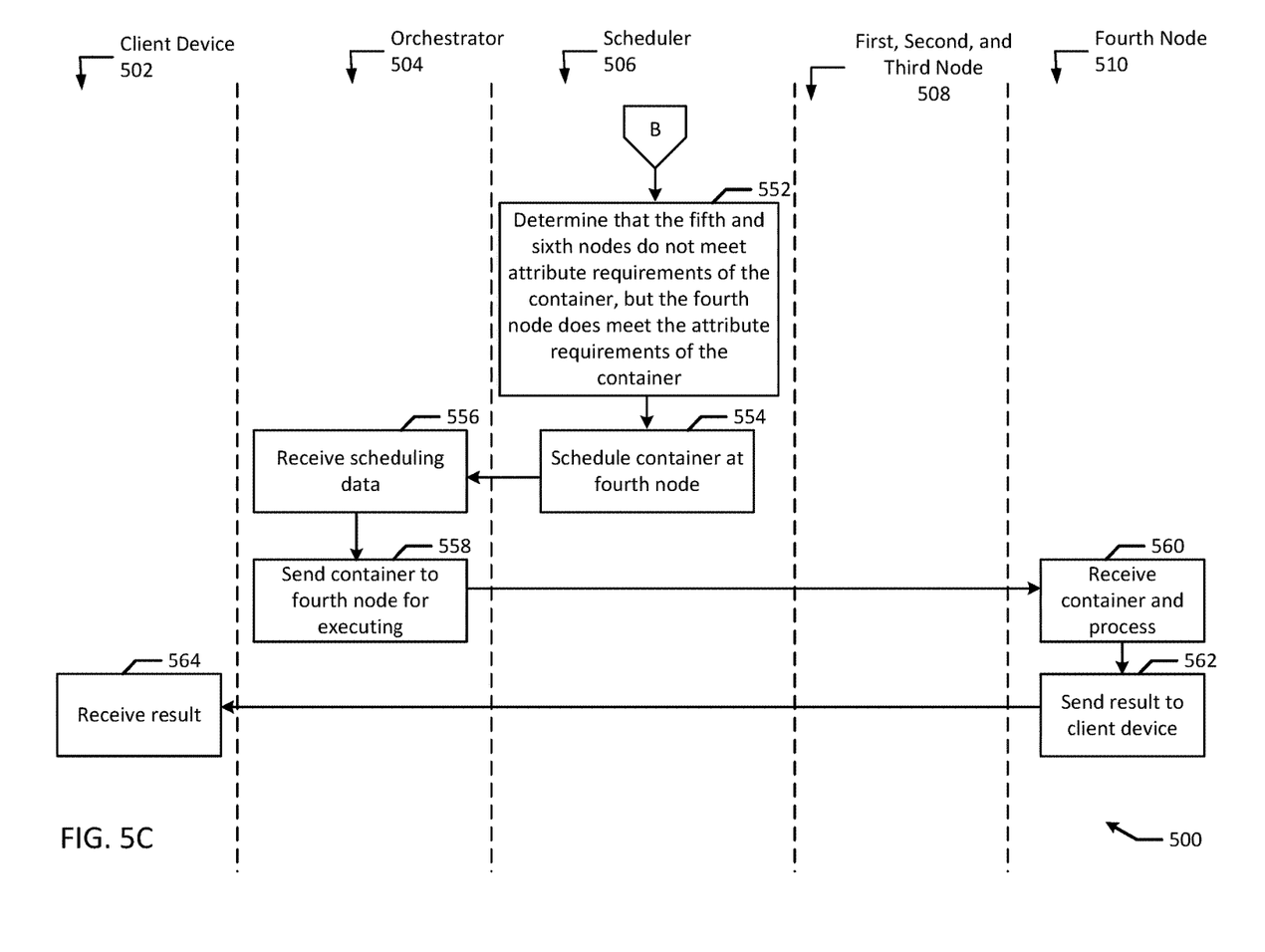
FIG. 5C is a flow diagram illustrating example methods of operating a system for a scheduling machine based on a distance matrix according to an example of the present disclosure.

FIGS. 5A to 5C illustrate a flowchart of an example method 500 for a scheduling machine based on a distance matrix. Although the example method 500 is described with reference to the flowchart illustrated in FIGS. 5A to 5C, it will be appreciated that many other methods of performing the acts associated with the method may be used. For example, the order of some of the blocks may be changed, certain blocks may be combined with other blocks, and some of the blocks described are optional. The method 500 may be performed by processing logic that may include hardware (circuitry, dedicated logic, etc.), software, or a combination of both. For example, the method 500 may be performed by a system including a client device 502, an orchestrator 504, a scheduler 506, a first, second and third node 508, and a fourth node 510.

In the illustrated example, a first, second, and third node 508 send attribute values to the scheduler 506 (block 522). Further, a fourth node 510 sends its attribute values to the scheduler 506 (block 524). The scheduler 506 receives the attribute values of the nodes (block 520). These attribute values could be, for example, any type of specialized hardware, central processing units, memory type, memory amount, or availability zones. For example, the first node's attribute values are that it has a GPU, an SSD, 1 CPU Core, and 16 GB of memory. The second node's attribute values are that it has no GPU, no SSD, 1 CPU Core, and 16 GB of memory. The third node's attribute values are that it has no GPU, no SSD, 1 CPU Core, and 8 GB of memory. The fourth node's attributes are that it has a GPU, one SSD, 10 CPU Cores, and 64 GB of memory. All of these attribute values are sent to the scheduler 506.

Next, the scheduler 506 generates location metrics for each node based on each node's attributes (block 526). The scheduler then creates a distance matrix (block 528). For example, the scheduler, or an administrator, would quantify the attribute values creating schedulable characteristics. For example, the administrator or scheduler would determine that having a. GPU gives a node 2 points; having an SSD gives 5 points, a node adds one point per CPU core; and one point per every GB of memory. In this example, the first node would have a GPU (+2), an SSD (+5), 1 CPU Core (+1), and 16 GB of memory (+16). The location metric for the first node is 24 based on aggregating the schedulable characteristics. The second node has a location metric of 17, the third node has a location metric of 9, and the fourth node has a location metric of 81. In an alternative example, points could be awarded based on logarithmic functions. For example, nodes could be awarded points for memory based on taking the log of the memory size. The distance matrix is created, for example, by determining the distances between each node using the location metrics previously generated. For example, the distance between the first node and the fourth node is 57 (81−24=57), and the distance between the third node and the fourth node is 72 (81−9=72). Similarly, the distance values between each node are calculated and stored into the matrix.

A client device 502 sends a request to execute a container to the orchestrator 504 (block 530). The orchestrator 504 receives this request (block 532), and reads the container's attribute requirements from a register. In an alternative embodiment, the orchestrator 504 reads the container's attribute requirements from the container itself (e.g., metadata).

Next, scheduler 506 receives the request and the attribute requirements of the container (block 536). The scheduler 506 then selects a first random node at which to schedule the container (block 538). The scheduler 506 then checks to see whether the attribute requirements of the container meet the attribute values of the first random node. In one example, the attribute values of the first random node are read from a roster where each node publishes its current attribute values. In an alternative example, the attribute values of the first random node are read from the node itself If the attribute requirements of the container are met by the attribute values of the first random node, the container is scheduled to execute at the first random node. However, in this example, the scheduler 506 determines that the first random node does not meet the attribute requirements of the container (block 540). Therefore, scheduler 506 will select a second node based on the distance values in the distance matrix (block 542).

Next, undergoing the previously outlined process, the scheduler 506 will determine that the second node does not meet the attribute requirements of the container (block 544). Therefore, the scheduler 506 will select a third node based on a distance value in the distance matrix (block 546). Next, undergoing the previously outlined process, the scheduler 506 will determine that third node does not meet the attribute requirements of the container (block 548). Therefore, the scheduler 506 will select a fourth node based on the distance values in the matrix, and will also simultaneously randomly select a fifth and sixth node as well (block 550). By selecting a random fifth and sixth node to process in parallel with the fourth node, the scheduler will more rapidly find a node that meets the attribute requirements of the container in an example, the parallelization may occur earlier in the process. In an alternative example, the parallelization may occur later in the process or not at all.

Next, after attempting to initiate scheduling at the fourth, fifth and sixth nodes, and checking whether attribute requirements of the container met by the attribute values of the fourth, fifth and sixth nodes, the scheduler 506 determines that the fifth and sixth nodes do not meet the attribute requirements of the container, but the fourth node does meet the attribute requirements of the container (block 552). The scheduler 506 then schedules the container at the fourth node (block 554). The orchestrator 504 receives the scheduling data (block 556), and sends the container to the fourth node 510 for executing (block 558). The fourth node 510 receives and processes the container (block 560). The fourth node 510 sends the results of processing to the client device 502 (block 562). The client device 502 receives the result (block 564).

Figure 6:
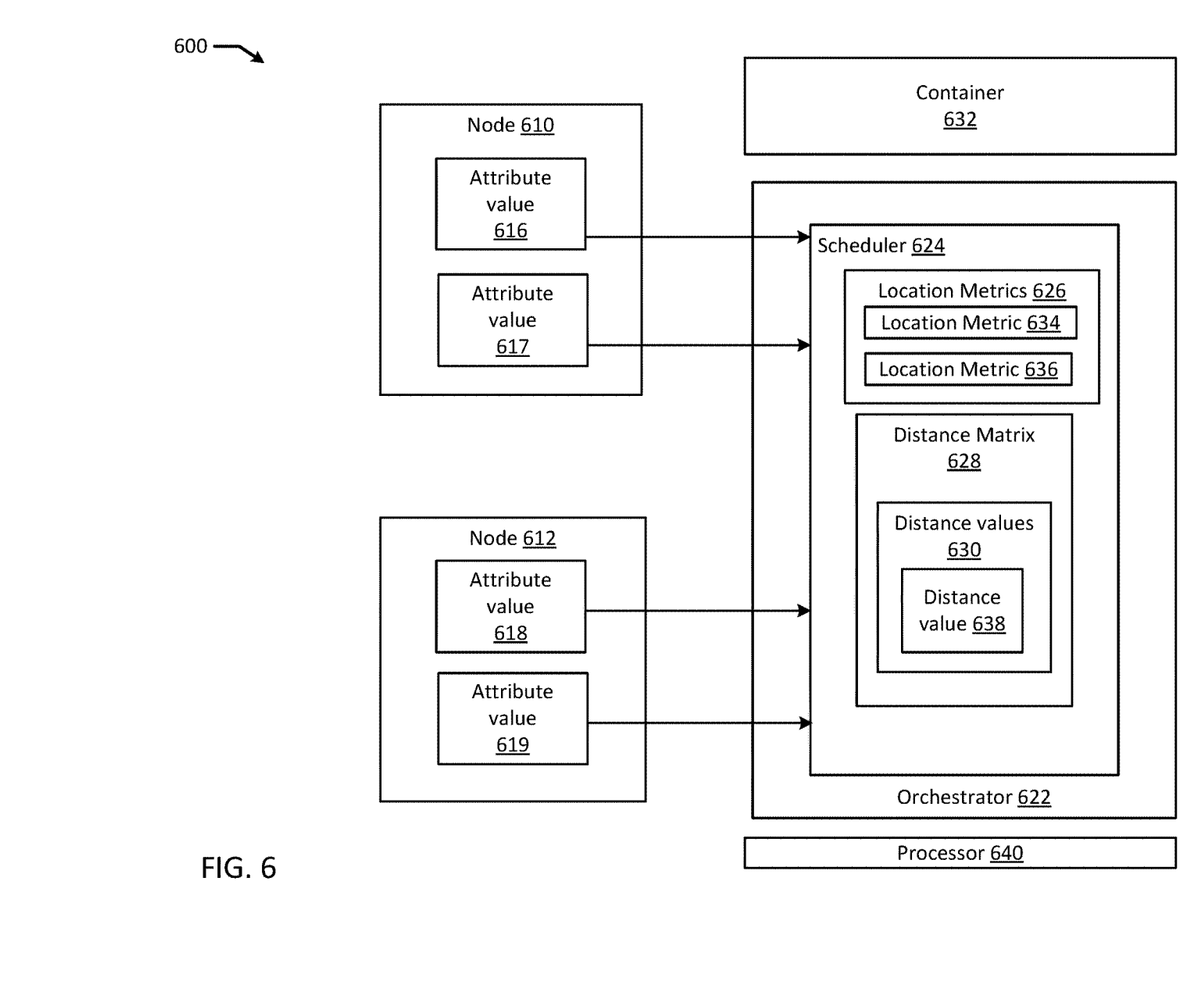
FIG. 6 is a block diagram of an example system according to an example of the present disclosure.

FIG. 6 is a block diagram of an example system according to an example of the present disclosure. As illustrated in FIG. 6, an example system 600 may include a processor 640, container 632, and an orchestrator 622. The orchestrator 622 includes scheduler 624 and runs on the processor 640.

The example system further includes a node 610 and a node 612. The node 610 includes attribute values 616 and 617. The node 612 includes attribute values 618 and 619. The attribute values 616, 617, 618, and 619 are sent to the scheduler 624. The scheduler, for example, could be located physically in the same location as the nodes, but it could also not be physically located in the same location. The scheduler could be connected to the nodes via a network switch, such as in server architecture, or via a network. The network may be a public network (e.g., the Internet), a private network (e.g., a local area network (LAN) or wide area network (WAN)), or a combination thereof.

The scheduler 624 generates a location metric 634 for the node 610 and a location metric 636 for the node 612. The scheduler 624 generates distance values 630 for all location metrics (e.g., 634, 636). The distance values 630 include a distance value 638 based on location metric 634 and location metric 636. The distance values 630 populate a distance matrix 628 which is used to select nodes to schedule.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its The invention is claimed as follows:

1. A method of container scheduling, comprising:
   receiving a plurality of attribute values for each node of a plurality of nodes, wherein the plurality of nodes are indicated as available to execute containers, including a first node in the plurality of nodes having a first plurality of attribute values, and a second node in the plurality of nodes having a second plurality of attribute values, wherein the first node is a randomly selected node of the plurality of nodes that is selected by a scheduler to schedule a container to be executed at the first node;
   generating a plurality of location metrics including a location metric for each node of the plurality of nodes based on each node's attribute values, the plurality of location metrics including a first location metric for the first node based on the first plurality of attribute values, and a second location metric for the second node based on the second plurality of attribute values;
   generating a plurality of distance values, wherein each distance value represents a respective distance between respective location metrics for respective nodes of the plurality of nodes and the first node, the plurality of distance values including a first distance value corresponding to the first location metric and the second location metric;
   populating a distance matrix with the plurality of distance values, including the first distance value;
   comparing, by the scheduler, attribute requirements of the container to the first plurality of attribute values;
   determining, by the scheduler, whether at least one of the attribute requirements of the container exceed a respective attribute value of the first plurality of attribute values;
   in response to determining that the at least one of the attribute requirements of the container does not exceed the respective attribute value of the first plurality of attribute values, scheduling the container to be executed at the first node, and
   in response to determining that the at least one of the attribute requirements of the container exceeds the respective attribute value of the first plurality of attribute values, selecting the second node from the distance matrix based on the first distance value, wherein the second node is selected from the distance matrix based on having the largest distance value from the first node, and the second node is selected to schedule the container to be executed at the second node.

2. The method of claim 1, wherein the attribute requirements of the container are provided in metadata of the container.

3. The method of claim 2, further comprising:
   reading, by the scheduler, the metadata of the container from a register.

4. The method of claim 2, further comprising:
   reading, by the scheduler, the metadata of the container from the container.

5. The method of claim 1, further comprising:
   comparing, by the scheduler, attribute requirements of the container to the second plurality of attribute values; and
   determining, by the scheduler, that all of the attribute requirements of the container meet respective attribute values of the second plurality of attribute values.

6. The method of claim 1, further comprising:
   comparing, by the scheduler, attribute requirements of the container to the second plurality of attribute values;
   determining, by the scheduler, that at least one of the attribute requirements of the container exceed a respective attribute value of the second plurality of attribute values;
   selecting a third node from the distance matrix based on a second distance value between the second node and the third node, the second distance value corresponding to the second location metric and a third location metric, wherein the third location metric is based on a third plurality of attribute values for the third node; and
   comparing, by the scheduler, attribute requirements of the container to the third plurality of attribute values.

7. The method of claim 6, wherein the third node is selected based on having the largest distance value from the second node in the distance matrix.

8. The method of claim 6, further comprising:
   comparing, by the scheduler, attribute requirements of the container to a fourth plurality of attribute values for a fourth node; and
   comparing, by the scheduler, attribute requirements of the container to a fifth plurality of attribute values for a fifth node.

9. The method of claim 8, wherein the fourth node and fifth node are selected at random.

10. The method of claim 1, further comprising:
    publishing, by each node in the plurality of nodes, an updated plurality of attribute values on a roster.

11. The method of claim 10, further comprising:
    updating, by the scheduler, the distance matrix based on the updated plurality of attribute values published by the plurality of nodes.

12. A system comprising:
    one or more processors;
    an orchestrator executing on the one or more processors; and
    a scheduler executing on the one or more processors to:
    receive a plurality of attribute values for each node of a plurality of nodes, wherein the plurality of nodes are indicated as available to execute containers, including a first node in the plurality of nodes having a first plurality of attribute values, and a second node in the plurality of nodes having a second plurality of attribute values, wherein the first node is a randomly selected node of the plurality of nodes that is selected by a scheduler to schedule a container to be executed at the first node;
    generate a plurality of location metrics including a location metric for each node of the plurality of nodes based on each node's attribute values, the plurality of location metrics including a first location metric for the first node based on the first plurality of attribute values, and a second location metric for the second node based on the second plurality of attribute values;
    generate a plurality of distance values, wherein each distance value represents a respective distance between respective location metrics for respective nodes of the plurality of nodes and the first node, the plurality of distance values including a first distance value corresponding to the first location metric and the second location metric;
    populate a distance matrix with the plurality of distance values, including the first distance value;
    compare, by the scheduler, attribute requirements of the container to the first plurality of attribute values;

determine, by the scheduler, whether at least one of the attribute requirements of the container exceed a respective attribute value of the first plurality of attribute values;

in response to determining that the at least one of the attribute requirements of the container does not exceed the respective attribute value of the first plurality of attribute values, schedule the container to be executed at the first node, and in response to determining that the at least one of the attribute requirements of the container exceeds the respective attribute value of the first plurality of attribute values, select the second node from the distance matrix based on the first distance value, wherein the second node is selected from the distance matrix based on having the largest distance value from the first node, and the second node is selected to schedule the container to be executed at the second node.

13. The system of claim 12, wherein the first location metric is generated by an administrator assigning a schedulable characteristic to each attribute value in the first plurality of attribute values for the first node, and aggregating each schedulable characteristic for the first node.

14. The system of claim 13, wherein each attribute value for each node of a plurality of nodes includes at least one of specialized hardware, central processing units, memory type, availability zones, and memory amount.

15. The system of claim 12, wherein the scheduler is at a different physical location than the plurality of nodes.

16. The system of claim 12, wherein the scheduler is at a same physical location as the plurality of nodes.

17. The system of claim 12, wherein the distance matrix is updated as the schedulable characteristics of each node of a plurality of nodes changes.

18. A non-transitory machine readable medium storing instruction, which when executed by one or more physical processors, cause the one or more physical processors to:

receive a plurality of attribute values for each node of a plurality of nodes, wherein the plurality of nodes are indicated as available to execute containers, including a first node in the plurality of nodes having a first plurality of attribute values, and a second node in the plurality of nodes having a second plurality of attribute values, wherein the first node is a randomly selected node of the plurality of nodes that is selected by a scheduler to schedule a container to be executed at the first node;

generate a plurality of location metrics including a location metric for each node of the plurality of nodes based on each node's attribute values, the plurality of location metrics including a first location metric for the first node based on the first plurality of attribute values, and a second location metric for the second node based on the second plurality of attribute values;

generate a plurality of distance values, wherein each distance value represents a respective distance between respective location metrics for respective nodes of the plurality of nodes and the first node, the plurality of distance values including a first distance value corresponding to the first location metric and the second location metric;

populate a distance matrix with the plurality of distance values, including the first distance value;

compare, by the scheduler, attribute requirements of the container to the first plurality of attribute values;

determine, by the scheduler, whether at least one of the attribute requirements of the container exceed a respective attribute value of the first plurality of attribute values;

in response to determining that the at least one of the attribute requirements of the container does not exceed the respective attribute value of the first plurality of attribute values, schedule the container to be executed at the first node, and in response to determining that the at least one of the attribute requirements of the container exceeds the respective attribute value of the first plurality of attribute values, select the second node from the distance matrix based on the first distance value, wherein the second node is selected from the distance matrix based on having the largest distance value from the first node, and the second node is selected to schedule the container to be executed at the second node.

* * * * *

UNITED STATES PATENT AND TRADEMARK OFFICE
CERTIFICATE OF CORRECTION

PATENT NO. : 10,467,046 B2
APPLICATION NO. : 15/608234
DATED : November 5, 2019
INVENTOR(S) : Vyas et al.

Page 1 of 1

It is certified that error appears in the above-identified patent and that said Letters Patent is hereby corrected as shown below:

In the Specification

In Column 3, Line 17, replace "tasks in" with --tasks. In--.

In Column 5, Line 41, replace "having a 4 CPUs" with --having 4 GPUs--.

In Column 6, Lines 13-14, replace "node 2. (205)." with --node 2 (205).--.

In Column 7, Line 22, replace "114, 116 and 118" with --114, 116, and 118--.

In Column 8, Line 59, replace "a. GPU" with --a GPU--.

In Column 9, Line 27, replace "itself If" with --itself. If--.

In Column 9, Line 49, replace "container in" with --container. In--.

Signed and Sealed this
Seventeenth Day of March, 2020

Andrei Iancu
*Director of the United States Patent and Trademark Office*